Figure 1:
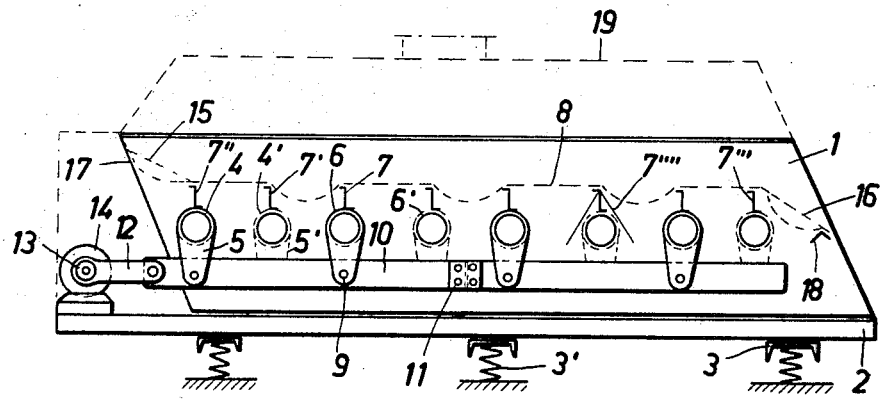

United States Patent

[11] 3,633,745

| [72] | Inventor | Albert Wehner<br>Haus 35, Germany |
|---|---|---|
| [21] | Appl. No. | 742,790 |
| [22] | Filed | July 5, 1968 |
| [45] | Patented | Jan. 11, 1972 |
| [32] | Priority | July 13, 1967 |
| [33] | | Germany |
| [31] | | W 44369 |

[54] SCREENING MACHINE
14 Claims, 4 Drawing Figs.

[52] U.S. Cl.................................................. 209/310,
209/325, 209/379
[51] Int. Cl................................................ B07b 1/28
[50] Field of Search........................................... 209/209,
367

[56] References Cited
UNITED STATES PATENTS

| 1,508,416 | 9/1924 | Sheldon...................... | 209/396 X |
| 2,410,147 | 10/1946 | Bleeke........................ | 209/310 X |
| 1,293,584 | 2/1919 | Vettermann................ | 209/310 |
| 1,958,322 | 5/1934 | Symington................... | 209/310 X |

FOREIGN PATENTS

| 900,704 | 9/1962 | Great Britain.............. | 209/367 |
| 1,451 | 1/1898 | Denmark...................... | 209/310 |
| 23,846 | 9/1897 | Great Britain.............. | 209/396 |
| 68,338 | 9/1892 | Germany...................... | 209/396 |
| 937,962 | 9/1963 | Great Britain.............. | 209/396 |

*Primary Examiner*—Frank W. Lutter
*Attorneys*—Curt M. Avery, Arthur E. Wilfond, Herbert L. Lerner and Daniel J. Tick ABSTRACT: A screening machine comprises a frame, a flexible screen floor attached at intervals to parallel screen floor attached at intervals to parallel screen floor supports which are fixed on supporting tubes rotatably mounted in bearings in the frame so that the screen floor supports can rock about the fixed axes of the supporting tubes, and a driving mechanism for oscillating the supporting tubes, and hence the screen floor supports, about their axes in such a way that adjacent supports alternately approach and recede from each other in order to flex and stretch alternately the screen floor between them, thus setting up a stationary wave in the screen floor.

Inventor:
Albert Wehner

SCREENING MACHINE

This invention relates to screening machines having a frame and a flexible screen floor attached at intervals to parallel screen floor supports which are mechanically driven so that adjacent supports alternately approach each other and recede from each other in such a way that the screen floor between them is alternately flexed and stretched to produce stationary waves.

Screening machines of this kind are known from British specification 1,106,513. The formation of stationary waves by the alternate flexing and stretching of the screen floor at various positions applies very high accelerations to the material being screened. This effect is particularly marked when the screen floor vibrates locally between a strongly convex shape and a moderately convex shape, that is to say between a slack or flexed state and a taut or stretched state. In this vibratory movement it is important to ensure that the openings in the screen floor repeatedly change shape, because this tends to prevent them from becoming clogged with the material being screened and thus helps to keep them clear. In the known screening machines this vibration of the flexible screen floor is obtained by mounting the screen floor on supports which are alternately mounted on two separate frame systems. These systems are driven so that the supports are caused to describe circles, the supports on one system being out of phase with the supports on the other. However, this arrangement is comparatively complex and costly to manufacture, mainly because the two separate frame systems have to be driven with great precision, to ensure that their movements maintain a fixed relationship with each other.

The object of the present invention is to provide a screening machine which retains the advantages of the known machines with regard to the movements of the screen floor, but in which the driving system for the screen floor, with its supports and their bearings, is greatly simplified.

With this aim, according to the invention, a screening machine comprises a frame, a flexible screen floor attached at intervals to parallel screen floor supports which are mounted so that they can rock about fixed axes relative to the frame, and a driving mechanism for oscillating the screen floor supports about their axes in such a way that adjacent supports alternately approach and recede from each other in order to flex and stretch alternately the screen floor between them, thus setting up a stationary wave in the screen floor. In such a screening machine the screen floor supports do not move on a circular path, as they do in previous screening machines, but merely rock about axes which are themselves stationary with respect to the frame of the machine. This arrangement allows the screen floor supports to be mounted and driven in a much simpler way.

The screen floor supports are preferably mounted on supporting tubes rotatably mounted in the frame, alternate tubes being fitted at opposite ends with rocking levers which are themselves pivoted alternately to two longitudinal beams which, in use, are oppositely reciprocated to oscillate the screen floor supports. The longitudinal beams are located outside the two sidewalls of the frame, and are driven by a motor through a pair of connecting rods and eccentrics which are 180° out of phase with each other.

The construction of the machine may be made particularly robust and compact by mounting the frame on springs, and by mounting the driving motor on an extension of the frame at the feed end of the machine.

Figure 2:
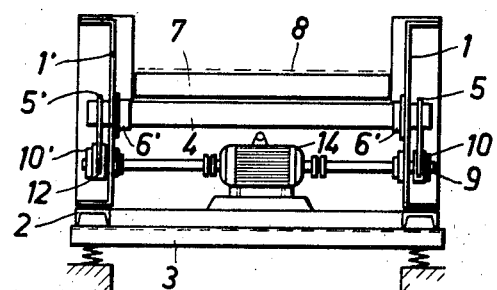
Figure 3:
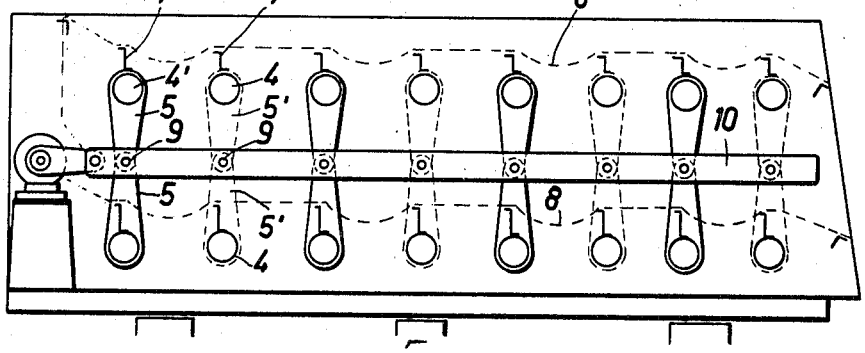
Figure 4:
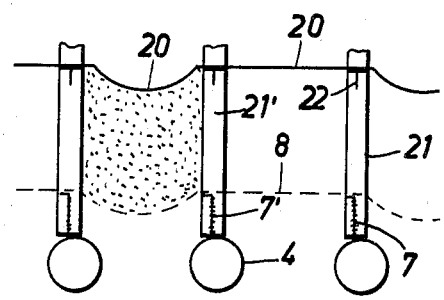

Examples of screening machines in accordance with the present invention will now be described with reference to the accompanying drawings, in which:

FIG. 1 is a diagrammatic side view of a first example;
FIG. 2 is a front view of the machine shown in FIG. 1;
FIG. 3 is a diagrammatic side view of a second example; and,
FIG. 4 shows a detail of a third example.

The screening machine shown in FIGS. 1 and 2 has a box frame with two sidewalls 1, 1', longitudinal beams 2 and transverse beams 3, the whole forming a supporting frame. The frame is supported on its base by springs 3'. Supporting tubes 4, 4' are rotatably mounted in bearings 6, 6' in the sidewalls 1, 1'. The bearings 6, 6' are preferably plain bearings of a material having a low coefficient of friction or having self-lubricating properties, such as a sintered bronze, a polyamide, a synthetic resin or the like. On the other hand the bearings 6, 6' can if desired be ball bearings or roller bearings, for example needle bearings. Alternatively the supporting tubes 4, 4' can rotate in sleeves connected to elastic bushes inserted into the sidewalls 1, 1'.

Fixed to the supporting tubes 4, 4' are screen supports 7, 7', which have bent over edges to which a flexible screen floor 8 is attached at certain regions. The screen floor supports 7, 7' can be in the form of transverse strips extending all the way across the screen floor 8, or if desired can consist of individual attachment members such as rods, bolts or the like, to which the screen floor 8 is attached at separate points. The screen floor supports 7, 7' and the supporting tubes 4, 4' can if desired be covered over by flexible skirts 7'''' capable of oscillating with the supports to prevent screened material from caking on them.

Alternate ends of the individual supporting tubes 4, 4' project outwards beyond the sidewalls 1, 1', the projecting ends being in each case fitted with a rocking lever 5, 5' in the other end of which is pivoted to a reciprocating beam 10, 10'. The connection between the beam 10, 10' and the rocking lever 5, 5' can be either by means of a bolt 9 fixed to the reciprocating beam 10, 10' and working in a slot in the rocking lever, or by means of a bolt fixed to the rocking lever and working in a hole or bush in the reciprocating beam. The reciprocating beams 10, 10' are preferably made of plastic or of compressed wood or the like, to reduce weight and give good running properties. Furthermore each reciprocating beam 10, 10' may if desired be divided into lengths joined together by straps 11.

Each reciprocating beam, 10, 10' is driven by a connecting rod 12 and an eccentric 13 on the shaft of a common motor 14, which has a double-ended driving shaft. The motor 14 is mounted directly on an extension of the base frame 2 at the feed end of the machine. The two eccentrics 13, one on each side of the motor 14, are adjustable and work with a 180° phase difference, so that the reciprocating beams are opposite in their movements, giving the rocking levers 5, 5' and the screen floor supports 7, 7' oppositely alternating rocking movements. The screen floor 8, which is attached to the supports 7, 7' at separate places, thus performs a stationary wave movement as suggested in the drawing, each region of the screen floor 8 alternately sagging down and becoming tensioned. If the screen floor 8 is anchored to its supports not all the way across but rather at particular points, there is superposed on this stationary wave movement a second transverse wave movement which, if the anchoring points are offset, results in diagonally transverse stationary waves.

At the feed end and at the delivery end of the screen floor 8, and also at the sides, there are flexible floor plates 15, 16, each of which is attached to a floor screen support 7'', 7''', or to the screen floor itself, and is also attached to a transverse plate 17, 18 extending across between the two sidewalls of the frame, or directly to the sidewalls. By means of these flexible plates or mats 15, 16 the flexible screen floor 8 is attached flexibly at both ends and at the sides to the frame, the plates or mats 15, 16 at the feed and delivery ends taking part in the wave movements imparted by the screen floor supports 7'', 7'''. The flexible mats at the two sides ensure that fine screened material cannot escape at the sides of the screen, and at the same time prevent the screened material from caking on the walls of the frame.

In the example shown each of the supporting tubes 4, 4' is driven by one end only from one or other of the reciprocating beams 10, 10'. However as an alternative it is quite possible to drive each supporting tube from both ends, for example, on each side of the frame there can be two reciprocating beams 10, 10' reciprocating in alternation, so that there are all together four reciprocating beams, two on each side, the four reciprocating beams all being driven by connecting rods 12 and eccentrics 13 from the same motor 14.

FIG. 3 shows a screening machine according to the invention which has two screen floors 8, 8' one above the other. The two screen floors 8, 8' are driven by a single pair of reciprocating beams 10, 10', each reciprocating beam driving pairs of rocking levers 5, 5' one lever of each pair for the upper screen floor and the other lever for the lower screen floor, the pairs of rocking levers being arranged alternately at the sides of the frame. Each lever 5, 5' of each pair is connected to a supporting tube 4, 4' rotatably mounted in the frame and oscillates the tube and its associated floor support 7, 7' as the beam 10, 10' reciprocates. The levers 5, 5' are connected to the beams 10, 10' by means of bolts 9 fixed to the beams 10, 10' and working in vertical slots in the levers 5, 5'.

Here again each of the screen floors 8, 8' performs a stationary wave movement, the floor regions between the screen floor supports 7, 7' alternately becoming slack and taut. If desired the lower floor 8 can take the form of a flexible strip of nonscreening material, to act merely as a conveying strip.

In the operation of a screening machine according to the invention the material being screened is subjected to very high accelerations, and it is in some cases desirable to equip the machine with a hood to act as a dust cover, that is to say to retain the finer particles of the material, as indicated by the broken lines in FIG. 1.

When very difficult material is being screened, caking can occur in the hood 19. For these cases it is advisable to use a flexible cover as shown at 20 in FIG. 4. The flexible cover 20 is also attached at intervals to transverse supports 22, which are mounted by means of vertical supports 21, 21' on the screen floor supports 7, 7'. The flexible cover 20 performs the same local movements, alternating between slack and taut, as the screen floor 8 itself. This arrangement not only prevents caking of the jumping grains of material, but also strikes the grains downward from above. This extra action on the grains of material is particularly advantageous when screening a heavy ore. For example, when a screened granular material is being fed to a blast furnace, it is advantageous to free the grains from adhering matter.

I claim:

1. A screening machine consisting of a frame, a flexible screen floor a plurality of parallel screen floor supports, means attaching said screen floor to said screen floor supports, mounting means mounting said screen floor supports on said frame so that said screen floor supports are rockable about fixed axes relative to said frame, and driving means for oscillating said screen supports about said fixed axes in such a way that adjacent screen floor supports alternately approach and recede from each other in order to flex and stretch alternately the screen floor between, thus setting up a stationary wave in said screen floor, said mounting means comprising a plurality of supporting tubes, means fixing said screen floor supports to said supporting tubes, and means rotatably mounting said supporting tubes in said frame, and said driving means including two reciprocable longitudinal beams, a plurality of rocking levers which are fitted at one of their ends alternately to opposite ends of alternate supporting tubes, means pivotally connecting said rocking levers at their other ends alternately to said longitudinal beams, and means for oppositely reciprocating said longitudinal beams to oscillate said screen floor supports.

2. A screening machine as set forth in claim 1, wherein said longitudinal beams are located one on each side of said frame, and said means for oppositely reciprocating said longitudinal beams includes a motor, and a pair of connecting rods and eccentrics which are 180° out of phase with each other.

3. A screening machine as set forth in claim 2, wherein said frame is supported on springs, and said frame has an extension at the feed end of the machine, said driving motor being mounted on said extension.

4. A screening machine as set forth in claim 1, including flexible plates at the feed and delivery ends of said screening floor, transverse members extending between the sides of said frame at the feed and delivery ends, and means attaching said flexible plates to said transverse members and to one of said screen floor and said screen floor supports.

5. A screening machine as set forth in claim 1, including flexible plates at the sides of said screening floor, and means attaching said flexible plates to the sides of said frame and to one of said screen floor and said screen floor supports.

6. A screening machine as set forth in claim 1, wherein said means rotatably mounting said supporting tubes in said frame consists of one of the group comprising roller bearings, elastic bearing bushes and plain bearings made of, for example, either one of synthetic plastics and bronze having a low coefficient of friction of self-lubricating properties.

7. A screening machine as set forth in claim 1, including a second screening floor, said first and said second floor being arranged one above the other, a second set of floor supports, means attaching said second floor to said second set of floor supports, and means for driving said second set of floor supports so as to flex and stretch said second floor in the same way as said first floor.

8. A screening machine as set forth in claim 7, wherein said means for driving said second floor supports includes support members which mount said second floor supports on said first floor supports.

9. A screening machine as set forth in claim 7 wherein said means for driving said second floor supports includes support members which mount said second floor supports on said first supporting tubes.

10. A screening machine as set forth in claim 1 wherein each of said screen floor supports is a strip which extends all the way across said screen floor.

11. A screening machine as set forth in claim 1, wherein each of said screen supports consist of a plurality of individual members to which said screen floor is attached at separate points.

12. A screening machine as set forth in claim 1 including a second floor formed of impermeable nonscreening material, said first and said second floor being arranged one above the other, a second set of floor supports, means attaching said second floor to said second set of floor supports, and means for driving said second set of floor supports so as to flex and stretch said second floor in the same way as said first floor.

13. A screening machine consisting of a frame, a flexible screen floor, a plurality of parallel screen floor supports, means attaching said screen floor to said screen floor supports, mounting means mounting said screen floor supports on said frame so that said screen floor supports are rockable about fixed axes relative to said frame, and driving means for oscillating said screen supports about said fixed axes in such a way that adjacent screen floor supports alternately approach and recede from each other in order to flex and stretch alternately the screen floor between, thus setting up a stationary wave in said screen floor, and including a second screen floor, said first and said second floor being arranged one above the other, a second set of floor supports, means attaching said second floor to said second set of floor supports, and means for driving said second set of floor supports so as to flex and stretch said second floor in the same way as said first floor, said means for driving said second set of floor supports including second supporting tubes, means fixing said second floor supports on said second supporting tubes, means rotatably mounting said second supporting tubes in said frame, second rocking levers alternately fitted at one of their ends to opposite ends of alternate supporting tubes, and means pivotally connecting the other ends of said rocking levers alternately to said reciprocable longitudinal beams which drive said first floor.

14. A screening machine consisting of a frame, a flexible screen floor, a plurality of parallel screen floor supports, means attaching said screen floor to said screen floor supports, mounting means mounting said screen floor supports on said frame so that said screen floor supports are rockable about fixed axes relative to said frame, driving means for oscillating said screen supports about said fixed axes in such a way that adjacent screen floor supports alternately approach and recede from each other in order to flex and stretch alternately the screen floor between, thus setting up a stationary wave in said screen floor, a second floor formed of impermeable nonscreening material, said first and said second floor being arranged one above the other, a second set of floor supports, means attaching said second floor to said second set of floor supports, means for driving said second set of floor supports so as to flex and stretch said second floor in the same way as said first floor, said means for driving said second set of floor supports including second supporting tubes, means fixing said second floor supports on said second supporting tubes, means rotatably mounting said second supporting tubes in said frame, second rocking levers alternately fitted at one of their ends to opposite ends of alternate supporting tubes, and means pivotally connecting the other ends of said rocking levers alternately to said reciprocable longitudinal beams which drive said first floor.

* * * * *

PO-1050
(5/69)

UNITED STATES PATENT OFFICE
CERTIFICATE OF CORRECTION

Patent No. 3,633,745  Dated January 11, 1972

Inventor(s) Albert Wehner

It is certified that error appears in the above-identified patent and that said Letters Patent are hereby corrected as shown below:

In the heading to the printed specification, the inventors correct address is:

--Haus 35, Wieladingen Post Schweikhof, Germany--

Signed and sealed this 11th day of July 1972.

(SEAL)
Attest:

EDWARD M. FLETCHER, JR.
Attesting Officer

ROBERT GOTTSCHALK
Commissioner of Patents